Patented Mar. 1, 1927.

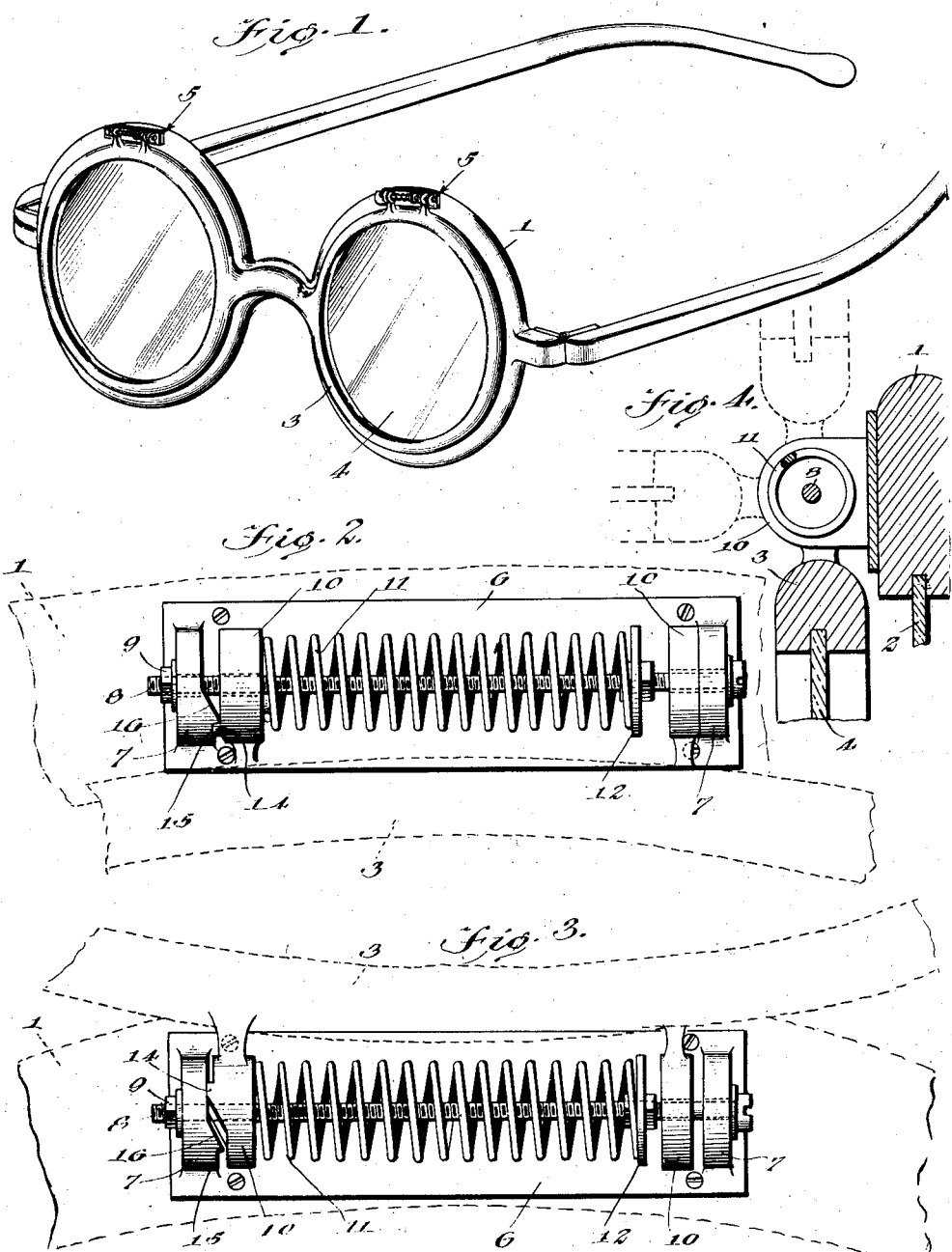

1,619,659

UNITED STATES PATENT OFFICE.

JOSEPH TANNER EVANS, OF BOISE, IDAHO.

EYEGLASSES OR SPECTACLES.

Application filed February 12, 1925. Serial No. 8,713.

This invention relates to an improvement in eyeglasses or spectacles of the type having reading lenses and auxiliary lenses cooperable with the reading lenses to provide distance lenses.

The object of the present invention is the provision of a device of this character wherein the frames of the reading lenses and auxiliary lenses are hingedly connected in a permanent and positive fashion and yet in such a way as to permit the auxiliary lenses to be shifted out of the field of and out of cooperative relation with respect to the reading lenses whereby the reading lenses may be used alone, the auxiliary lenses being readily shifted into cooperative relation with respect to the reading lenses and being held in such relation to provide distance lenses.

One of the principal objects of the present invention resides in the feature of so interconnecting and mounting the frames of the auxiliary and reading lenses that the lenses may be securely and releasably held in any adjustment thereby rendering the eyeglasses or spectacles satisfactory and convenient in all of their adjustments.

Other objects and advantages of the invention reside in certain novel features of the construction, arrangement and combination of parts which will be hereinafter more fully set forth and particularly pointed out in the appended claims, reference being had to the accompanying drawings forming a part of this specification, and in which:

Figure 1 is a perspective view of one embodiment of the invention;

Figure 2 is a detail view in elevation showing the hinge connection employed in Figure 1, the hinge connection being shown as when positioned to dispose the auxiliary lenses in cooperative relation with respect to the reading lenses;

Figure 3 is a view similar to Figure 2 but showing the hinge connection as when positioned to dispose the auxiliary lenses out of the field of and out of cooperative relation with respect to the reading lenses; and Figure 4 is a view in section showing the different positions that the auxiliary lenses may be made to assume with respect to the reading lenses.

Referring to the drawings the numeral 1 designates the main frame in which the reading lenses 2 are mounted in the usual manner. An auxiliary frame 3 is provided and has auxiliary lenses 4 mounted therein. The lenses 2 have a foci and are designed to permit of their use alone for reading and the lenses 4 are so designed that when used in combination with the lenses 2 the glasses may be used for distant vision.

Hinge connections designated generally at 5 are provided between the auxiliary frame 3 and the main frame 1. These hinge connections are of identical construction and each includes a mounting plate 6 fastened to the main frame 1 and having a pair of lugs 7 integrally formed therewith or otherwise suitably connected thereto adjacent its ends. A pivot bolt 8 is mounted in the lugs 7 and is releasably held in position by a nut 9. Lugs 10 are integrally formed with or otherwise suitably connected to the auxiliary frame 3 and these lugs 10 have apertures in which the pivot bolt 8 is received whereby the auxiliary frame is pivotally mounted on or hingedly connected to the main frame. The openings in the lugs 10 are also adapted to permit these lugs to have a certain amount of sliding movement on the bolt 8. A coil spring 11 is mounted on the bolt 8 and one end of the coil spring abuts one of the lugs 10, the other end of the coil spring abutting a collar 12 fixed on the rod. The spring 11 urges the lug 10 which it engages toward the adjacent lug 7.

Interengaging means is provided between the lug 10 engaged by the spring 11 and the lug 7 which such lug 10 engages for the purpose of releasably holding these lugs in adjusted position and this means comprises a projection 14 integral with the lug 10 engaged by the spring 11 and a notch 15 formed in the lug 7 adjacent such lug 10. Adjacent one side of the notch 15 an inclined surface 16 is provided. The projection 14 when engaged in the notch 15 holds the frame 3 up against the frame 1 as shown in Figures 1 and 2 so that the lenses 4 and the lenses 2 coact to provide distance lenses. When the frame 3 is shifted to the right as viewed in Figure 2 and turned up to the position shown in Figures 3 and 4 the lenses 4 are disposed out of the field of the lenses 2 so that the lenses 2 may be used as reading glasses. The frame 3 may be swung up to a vertical position or to a position at an angle of approximately 45 degrees as illustrated in Figure 4 and is releasably held in any of such positions.

In connection with the shifting of the auxiliary lenses out of the field of the reading lenses, it is to be understood that the angular distance of the lenses at such time may be made to vary as desired. For instance, the frame 3 may be swung to and releasably held in a position at an angle of 15° or 20° with respect to the lenses 2 so as to be used in the same way as the ordinary bifocal lens.

I claim:

1. Eyeglasses having two sets of cooperable lenses, a frame carrying each set of lenses, and a pair of hinge connections between the frames, each hinge connection comprising a pair of lugs carried by one frame, a pivot bolt mounted on said lugs, a pair of lugs carried by the other frame member and mounted on said pivot bolt, a laterally directed projection on one of said lugs, the adjacent lug having a cooperable notch, and spring means to urge the lug and notch into engagement.

2. Eyeglasses having two sets of cooperable lenses, a frame carrying each set of lenses, and a pair of hinge connections between the frames, each hinge connection comprising a pair of lugs carried by one frame, a pivot bolt fixed to and extending between the members of said pair of lugs, a pair of lugs carried by the other frame member and slidably and rotatably mounted on said pivot bolt, an expansion coil spring mounted on said pivot bolt, an abutment fixed to said pivot bolt and engaging one end of said spring, the other end of said spring being engaged with one of said last mentioned lugs for urging it into engagement with the adjacent pair, and cooperable means on said engaging lugs for holding the frame in adjusted position.

JOSEPH TANNER EVANS.